(12) United States Patent
Bastien

(10) Patent No.: US 8,514,841 B2
(45) Date of Patent: Aug. 20, 2013

(54) IP-BASED CALL CONTENT INTERCEPT USING REPEATERS

(75) Inventor: Stephane Bastien, Quebec (CA)

(73) Assignee: BroadSoft, Inc., Gaithersburg, MD (US)

( * ) Notice: Subject to any disclaimer, the term of this patent is extended or adjusted under 35 U.S.C. 154(b) by 1318 days.

(21) Appl. No.: 11/987,486

(22) Filed: Nov. 30, 2007

(65) Prior Publication Data

US 2009/0141883 A1    Jun. 4, 2009

(51) Int. Cl.
*H04L 12/66* (2006.01)
*H04M 3/42* (2006.01)
*H04M 7/00* (2006.01)

(52) U.S. Cl.
USPC ............. 370/352; 379/213.01; 379/221.01; 455/414.1

(58) Field of Classification Search
USPC . 379/213.01, 221.01, 229, 35; 370/352–356; 455/414.1
See application file for complete search history.

(56) References Cited

U.S. PATENT DOCUMENTS

| 6,418,208 B1 * | 7/2002 | Gundlach et al. ............. 379/133 |
| 2002/0009973 A1 | 1/2002 | Bondy et al. |
| 2004/0165709 A1 | 8/2004 | Pence et al. |
| 2006/0133595 A1 | 6/2006 | Ravishankar |
| 2006/0222158 A1 | 10/2006 | Nagaraja |
| 2006/0269290 A1 * | 11/2006 | Greenspan .................... 398/140 |
| 2007/0121812 A1 * | 5/2007 | Strange et al. ................. 379/70 |
| 2010/0086119 A1 * | 4/2010 | De Luca et al. .......... 379/213.01 |

FOREIGN PATENT DOCUMENTS

WO    WO 2008/040583    * 4/2008

* cited by examiner

*Primary Examiner* — Asad Nawaz
*Assistant Examiner* — Joel Hamel
(74) *Attorney, Agent, or Firm* — Venable LLP; Michael A. Sartori; Todd R. Farnsworth

(57) ABSTRACT

A computer-readable medium for performing IP-based call intercept includes instructions for receiving call initiation data, a first IP packet from the first communications device, and a second IP packet from a second communications device, generating copies of the first IP packet and the second IP packet, and transmitting one of the first IP packets to the second communications device according to the call initiation data, another of the first IP packets to a surveilling agency computer system without encoding a decoding the IP packet, one of the second IP packets to the first communications device according to the call initiation data, and another of the second IP packets to the surveilling agency computer system without encoding or decoding the IP packet.

26 Claims, 12 Drawing Sheets

IP-BASED CALL CONTENT INTERCEPT USING REPEATERS

BACKGROUND

Lawful intercept of call content on the public switched telephone network (PSTN) is mandated functionality by the Communications Assistance for Law Enforcement Act (CALEA) in the United States and by similar legislation in many other countries. Phone calls carried over Internet protocol (IP) networks must comply with the same lawful intercept rules as calls carried over the traditional PSTN. Lawful intercept of call content over IP networks is difficult due to the wide range of protocols and codecs that are deployed. While the PSTN network typically carries audio data using G.711 over a dedicated time-division multiplexing (TDM) channel, voice over IP (VoIP) networks can be encoded using many codecs (e.g., G.711, G.729, iLBC) and transmitted using different protocols (e.g., real-time transport protocol (RTP), secure teal-time transport protocol (SRTP)).

There are four known methods for intercepting IP-based call content. IP-based call content may be intercepted at a network gateway when the call content is between a communications device on a VoIP network and a communications device on a traditional wired or wireless telephone network. This method allow for the interception of audio, but not video, data, or encrypted content. IP-based call content may also be intercepted at the session border controllers of the VoIP network. The session border controller may only be able to see the signaling from one party to a call. If lawful intercept applies to the second party to a call, the session border controllers may not know this and may not intercept the call. A third method allows for the interception of IP-based call content at routers and switches on an IP-network. This method requires that every packet of data passing through a router or switch be scanned to determine whether or not the packet needs to be intercepted. The VoIP provider generally has no control over this method of interception, as the routers and switches on the an IP-network outside of the VoIP provider's network belong to parties other than the VoIP provider. A fourth method allows for the interception of IP-based call content at the packet-based media processor through use of conferencing bridge. This method is limited to audio call content only, as video, data, and encrypted content may not intercepted. Further, the conferencing bridge must understand the audio codec being used by the communications devices on the call. This may require the conferencing bridge to force the communications devices on the call to change the codec they use, which may allow the parties using the communications devices to discover that the call is being intercepted.

As a first way, a PSTN gateway may be used to redirect a copy of call content to a surveilling agency. PSTN gateways may only accept a standard RTP stream containing audio, making it impossible for the gateways to provide the original user datagram protocol (UDP)/IP/RTP packet header, an abstract syntax notation number one (ASN.1) envelope as defined in T1.678, or other packet or envelope types required by country-specific rules and regulations. Further, the PSTN gateway may not accept video, T.38 signaling, or any other IP-based media protocols.

As a second way, IP-based call content may also be intercepted by session border controllers (SBCs). A session border control may redirect a copy of call content to a surveilling agency in the same manner as a PSTN gateway. surveilling agency The SBC may only see signaling for one of the two parties to a call, because the other party is hidden by an application server. If lawful intercept applies to the second party, the SBC may not know this because it can only see the signaling from the first party. The SBC may therefore not initiate the intercept of a call when the presence of the second party would make interception appropriate.

As a third way, IP-based call content may also be intercepted at an Ethernet switch or router on an IP-network in the path of the call content. As the IP packets, such as, for example, RTP, UDP, TCP/IP, and T.38 packets, containing the call content pass through a switch or router that is part of the network over which the call is routed, the switch or router may send copies of the IP packets to a surveilling agency. However, this may be processor intensive, since the switch or router must examine every single IP packet passing through to determine if the packet contains call content that is to be intercepted.

As a fourth way, IP-based call content may be intercepted at a packet-based media processor using a conferencing bridge. A call between two communications devices may be connected through a packet-based media processor on the VoIP provider's network. The packet-based media processor may setup a conferencing bridge. Each of the parties to the call may be connected to the conferencing bridge via a two way connection, so that each party can both talk and listen to the other parties on the call. A surveilling agency may be connected to the conferencing bridge via a one way connection, so that surveilling agency may listen to the other parties on the call, but may not talk, concealing the presence of the surveilling agency from the other parties. However, this may only work for audio content, the surveilling agency will receive only one audio stream containing audio from all parties to the call, and the conferencing bridge may be required to change the audio codec used by the communications devise on the call, which may increase the risk of the call interception being detected.

FIGS. 1A, 1B, 1C, and 1D depict four prior art systems for intercepting call content.

First communications device 101 may be any device suitable for communication, including making and/or receiving calls, over a VoIP network. For example, first communications device 101 may be a computer, set-top console, fax machine, VoIP handset, cellular handsets with VoIP capability, or any other handheld or stationary device with VoIP capability.

Second communications device 102 may be any device suitable for telecommunications over any communications network. For example, second communications device 102 may be any computer, phone, fax machine, set-top console, or handheld device connected to any communications network capable of receiving calls from a communications device connected to a VoIP network.

Communication between the first communications device 101 and the second communications device 102 may always travel over a VoIP network for at least a portion of the trip between the first communications device 101 and the second communications device 102. The first communications device 101 may be connected directly to a VoIP network, for example, through a VoIP service provider, or may be connected to another communications network which routes communications traffic over a VoIP network. The second communications device 102 may also be connected directly to a VoIP network, or may be connected to any other communications network which may receive communications traffic from a VoIP network. For example, the first communications device 101 may be a VoIP handset, and the second communications device 102 may be a landline connected to a traditional phone service. The communications from the first communications device 101 may travel of the VoIP network to which the first communications device 101 is connected, and then over the non-VoIP network to which the second communications device 102 is connected.

VoIP provider's network 103 may be an IP-network, or portion thereof, controlled by provider of VoIP services. The VoIP provider's network 103 may contain hardware used for the creation of IP-networks, such as, for example, routers, switches, hubs, servers, firewalls, and may have incoming and outgoing connections to other IP-networks. For example, the VoIP provider's network 103 may be the Internet, a section of the Internet controlled by the VoIP provider, or may be a proprietary IP networks, managed IP networks, or service provider's IP networks.

Router/switch 104 may be any router or switch used for handling routing and/or switching of traffic on an IP network, such as, for example, the Internet. For example, the router/switch 104 may be a router belonging to an internet service provider (ISP), handling the routing of traffic originating from the ISP's customers, and from other users of an IP network when the traffic passes through the network belonging to the ISP.

Session Border Controller (SBC) 105 and SBC 107 may be any computer, computing device, or the like on the border of the VoIP provider's network 103. For example, the SBC 105 and the SBC 107 may be hardware firewalls on the border of the VoIP provider's network 103 and may be responsible for monitoring all traffic entering and leaving the VoIP provider's network 103.

Application server 106 may be any computer, computing device, or the like suitable to function as a server on the VoIP provider's network 103. For example, the application server 106 may be a dedicated server. The application server 106 may control the routing of call content traveling over the VoIP network and the allocation of packet-based media processor resources for various calling features. For example, application server 106 may allocate proper packet-based media processor resources for videoconferencing and teleconferencing.

Packet-based media processor 110 may be any computer, computing device, or the like suitable to function as a server on the VoIP provider' network. For example, the packet-based media processor 110 may be a dedicated server. The packet-based media processor 110 may provide resources, such as, for example, processing cycles, required for various calling features, including, for example, videoconferencing, teleconferencing, speech recognition, and any other calling features provided by the VoIP network provider.

Network Gateway 111 may be any computer, computing device, or the like that may function as a gateway on a PSTN network. For example, the network gateway 111 may be a PSTN gateway. The network gateway 111 may function as a gateway between an IP-network, and VoIP networks on the IP-network, and wired and wireless telephone networks, allowing communication to take place between a communications device on a VoIP network and a communications devices on the wired and wireless networks.

Surveilling agency computer system 112 may be any computer, computing device, or the like, belonging to a surveilling agency or any other entity, such as, for example, a contractor or subcontractor, acting on behalf of a surveilling agency. Surveilling agencies may include, for example, the Federal Bureau of Investigation, the Central Intelligence Agency, the National Security Agency, the Department of Homeland Security, other federal and state law enforcement agencies and agencies supporting law enforcement in both the United States and foreign nations, and international organization such as, for example, Interpol. For example, surveilling agency computer system 112 may be a server located in the surveilling agency headquarters, a laptop or handheld computing device belonging to a field agent of the surveilling agency, a personal computer commandeered by the surveilling agency, etc. The surveilling agency computer system 112 may be controlled by the surveilling agency that has placed one or both of the first communications device 101 and the second communications device 102 under surveillance, as determined by the application server 106.

Collection function 113 may be any combination of software or hardware on the surveilling agency computer system 112 suitable for handling incoming call content. For example, collection function 113 may be a software program that records incoming call content to a computer readable medium accessible to the surveilling agency computer system 112. The recorded call content may be accessed on the surveilling agency computer system 112 after recording. As another example, collection function 113 may play back the incoming call content in real time.

Conferencing bridge 114 may be any combination of software and hardware on the packet-based media processor 110 suitable for handling a conference call. For example, conferencing bridge 114 may be software on the packet-based media processor 110 activated by the packet-based media processor 110 to set up a conference call between the first communications device 101 and the second communications device 102. A conference call may be similar to a normal call, except that more than two parties are allowed to be connected to the call at the same time.

FIG. 1A depicts the first previously used method for intercepting IP-based call content. As illustrated in FIG. 1A, the first previously used method for intercepting call content is described in, for example, U.S. Pat. No. 7,006,508 "Communication network with a collection gateway and method for providing surveillance services" to Bondy et. al. (Bondy), U.S. Pat. No. 6,870,905 "Wiretap implemented by media gateway multicasting" to Pelaez et. al. (Pelaez), and U.S. Pat. No. 7,092,493 "Methods and systems for providing lawful intercept of a media stream in a media gateway" to Hou et. al. (Hou). In this previous method, call content is intercepted at the network gateway 111. The first communications device 101 on the VoIP network may be used to initiate a call to the second communications device 102 on a telecommunications network which may be wired, wireless, or a combination of wired and wireless.

The first communications device 101 may initiate the call by sending call initiation data to the application server 106. Call initiation data may be Session Initiation Protocol (SIP) packets, Media Gateway Control Protocol (MGCP) packets, H.323 packets, or any other suitable data or packet type, and may contain data conforming to Session Description Protocol (SDP). The application server 106 may determine from the call initiation data that the call content needs to be routed through the network gateway 111, in order for the call content to reach the second communications device 102 on the traditional telephone networks. Call initiation data may be sent to the network gateway 111, and call content in the form of RTP packets may be sent from the first communications device 101 to the network gateway 111.

At the network gateway 111, the RTP packets may be converted into, for example, a TDM signal and transmitted over the telecommunications network to the second communications device 102. Call content from the second communications device 102, in the form of a TDM signal, may be transmitted over the telecommunications network to the network gateway 111, where the call content may be packetized into RTP packets. These RTP packets may be transmitted over the IP-network to the first communications device 101.

Call content may be intercepted at the network gateway 111. If either the first communications device 101 or the second communications device 102 is under surveillance, the network gateway may be instructed to copy the RTP packets incoming from the first communications device 101 and created from the call content incoming from the second communications device 102 and to transmit the copies to the surveilling agency computer system 112. The collection function 113 may handle the incoming call content according to the setup of the collection function 113. Because the network gateway 111 only understands RTP packets, only RTP packets containing an audio stream may be sent to the surveilling agency computer system 112. This may prevent the interception of any non-audio call data, such as, for example, video data or desktop collaboration data. Additionally, the network gateway 111 cannot copy and transmit Secure RTP (SRTP) packets, which may use 128-bit encryption, to the surveilling agency computer system 112. This may prevent the interception of any call data, audio or otherwise, that is encrypted.

FIG. 1B depicts the second previously used method for intercepting IP-based call content. As illustrated in FIG. 1B, the second previously used method for intercepting IP-based call content is described, for example, in Bondy. Call content is intercepted at the session border controllers 105 and/or 107. The first communications device 101 on the VoIP network may be used to initiate a call to the second communications device 102 on any VoIP or traditional wired or wireless telephone network.

The first communications device 101 may initiate a call to the second communications device 102, as described above. Call content in the form of RTP packets from the first communications device 101 may be transmitted over IP-networks, such as, for example, the Internet, to the VoIP provider's network 103. The RTP packets may reach the session border controller 105 on the edge of the VoIP provider's network 103. The session border controller 105 may help route the RTP packets through the VoIP provider's network 103, where the RTP packets will be directed to their destination. The RTP packets may pass through session border controller 107 upon leaving the VoIP provider's network 103. The RTP packets may then traverse other IP-networks, such as, for example, the Internet or managed IP networks, or service provider's IP networks, to reach the second communications device 102. Call content may be transmitted from the second communications device 102 to the first communications device 101 in the same manner, reaching session border controller 107 at the edge of the VoIP provider's network 103, and then session border controller 105 upon leaving the VoIP provider's network 103.

If either of the first communications device 101 or the second communications device 102 is under surveillance, the session border controllers 105 and 107 may be instructed to copy the incoming RTP packets from the first communications device 101 and the second communications device 102 and transmit the copies to surveilling agency computer system 112. The collection function 113 may handle the incoming call content according to the setup of the collection function 113. Each of the session border controllers 105 and 107 surveilling agency may only see signaling for one of the two parties to a call, because the other party is hidden by an AS. If lawful intercept applies to the second communications device 102, the session border controllers 105 may not know this because it can only see the signaling from the first communications device 101. The session border controller 105 may therefore not initiate the intercept of a call when the presence of the second communications device 102 would make interception appropriate. The session border controller 107 may face the same limitations with respect to the first communications device 101.

FIG. 1C depicts the third previously used method for intercepting IP-based call content. As illustrated in FIG. 1C, the third previously used method for intercepting call content is described in, for example, Bondy. Call content is intercepted at the router/switch 104. The first communications device 101 on the VoIP network may be used to initiate a call to the second communications device 102 on any VoIP or traditional wired or wireless telephone network.

When the first communications device 101 transmits call content to the second communications device 102, and vice versa, the call content, in the form of IP packets, such as, for example, RTP, UDP, TCP/IP and T.38 packets, must traverse an IP-network. In traversing the IP-network, the IP packets may be routed and switched through the router/switch 104, which may be one of the routers and switches responsible for routing IP packets on the IP-network. If either the first communications device 101 or the second communications device 102 is under surveillance, call content may be intercepted as it passes through the router/switch 104 on its way to or from the VoIP provider's network 103.

In order for call content to be intercepted by the router/switch 104, the router/switch 104 may be instructed to check every incoming IP packet to determine whether the incoming IP packet is part of the call content between the first communications device 101 and the second communications device 102. When an IP packet that is part of the call content between the first communications device 101 and the second communications device 102 is detected by the router/switch 104, the router/switch 104 may copy the IP packet and transmit the copy to the surveilling agency computer system 112. The collection function 113 may handle the incoming call content according to the setup of the collection function 113. The computational resources required to check every incoming IP packet passing through the router/switch 104 are immense. The result of attempting to check every incoming IP packet using currently available routing and switching hardware would be a slowdown in traffic passing through the router/switch 104, as each packet was checked to determine if the packet belonged to an intercepted call.

FIG. 1D depicts the fourth previously used method for intercepting IP-based call content. Call content is intercepted at the packet-based media processor 110 through the use of the conferencing bridge 114. The first communications device 101 on the VoIP network may be used to initiate a call to the second communications device 102 on any VoIP or traditional wired or wireless telephone network. This may require the first communications device 101 to transmit call initiation data to the application server 106. The application server 106 may examine the call initiation data to determine if either the first communications device 101 or the second communications device 102 is under surveillance.

If either the first communications device 101 or the second communications device 102 is under surveillance, the application server 106 may instruct the packet-based media processor 110 to setup conferencing bridge 114. The application server 106 may then modify the call initiation data so that the first communications device 101 and the second communications device 102 send call content to the conferencing bridge 114 on the packet-based media processor 110, setting up a conference call. The conferencing bridge 114 may then connect the surveilling agency computer system 112 to the conference call between the first communications device 101 and the second communications device 102 via a one way, listening only, connection. As part of the conference call, the surveilling agency 112 may listen to the audio content transmitted between the first communications device 101 and the second communications device 102, intercepting the call content.

The conferencing bridge 114 may only be able to handle unencrypted audio content, and may not be able to set up a conference call with video, data, or encrypted content. The conferencing bridge 114 may also be required to force the first communications device 101 and the second communications device 102 to use an audio codec with which the conferencing bridge 114 is compatible. The forced change of audio codec may be detected by the users of the first communications device 101 and the second communications device 102, allowing the user to discover that the call is being intercepted.

Each of the four prior art methods of intercepting IP based call content may be used when more than two communications devices participate in the call, such as, for example, during a conference call.

Also in the prior art, VoIP providers currently use packet-based media processors to provide additional calling features on their networks. These calling features may include, for example, voice mail, speech recognition, teleconferencing, video conferencing, and desktop collaboration. Calls requiring the use of these features are routed through the VoIP provider's network 103 to the VoIP provider's packet-based media processor, where the computing resources in the form of software and/or hardware needed to implement the features may be provided.

FIG. 2 depicts an exemplary embodiment of the use of a packet-based media processor in a VoIP network according to the prior art. The first communications device 101 may initiate, for example, a video conference with the second communications device 102. The call initiation data transmitted from the first communications device 101 to the application server 106 may indicate that the call is to be a video conference. The application server 106 may then transmit information to the packet-based media processor 110, instructing the packet-based media processor 110 to set up a video conferencing module 201, to be used by the first communications device 101 and the second communications device 102. Video conferencing module 201 may be any combination of hardware and software on the packet-based media processor 110 suitable for providing the necessary resources for the routing of video and audio data between the participants in a video conference call.

Call content transmitted from the first communications device 101, in the form of a stream of RTP packets containing audio and a stream of RTP packets containing video, is then routed to the packet-based media processor 110 upon reaching the VoIP provider's network 103, for example, at session border controller 105. The video conferencing module 201 may handle any necessary processing of the call content, including the audio and video, to ensure the video conference functions properly. The call content is transmitted from the packet-based media processor 110 to the second communication device 102. Call content transmitted by the second communications device 102 is handled in a likewise manner, being routed to the packet-based media processor 110 upon reaching the VoIP provider's network 103, for example, at session border controller 107. If the video conference call has more than two participants, the video conferencing module 201 may handle any necessary copying of the audio and video and manage the transmission of the copied audio and video to all other communication devices participating in the video conference call.

SUMMARY

One embodiment includes a computer-readable medium comprising instructions, which when executed by a computer system causes the computer system to perform operations for IP-based call content intercept, the computer-readable medium including: instructions for receiving at least one call initiation data, instructions for receiving a first IP packet from a first communications device, instructions for receiving a second IP packet from a second communications device, instructions for generating a plurality of first IP packets comprising either the first IP packet and at least one copy of the first IP packet, or at least two copies of the first IP packet, instructions for generating a plurality of second IP packets comprising either the second IP packet and at least one copy of the second IP packet, or at least two copies of the second IP packet, instructions for transmitting one of the plurality of first IP packets to the second communications device according to one or more of the call initiation data, instructions for transmitting another of the plurality of first IP packets to a surveilling agency computer system without encoding or decoding the another of the plurality of first IP packets, instructions for transmitting one of the plurality of second IP packets to the first communications device according to one or more of the call initiation data, and instructions for transmitting another of the plurality of second IP packets to the surveilling agency computer system without encoding or decoding the another of the plurality of second IP packets.

One embodiment includes a computer-implemented method for IP-based call content intercept, comprising: receiving at least one call initiation data, receiving a first IP packet from the first communications device, receiving a second IP packet from a second communications device, generating a plurality of first IP packets comprising either the first IP packet and at least one copy of the first IP packet, or at least two copies of the first IP packet, generating a plurality of second IP packets comprising either the second IP packet and at least one copy of the second IP packet, or at least two copies of the second IP packet, transmitting one of the plurality of first IP packets to the second communications device according to one or more of the call initiation data, transmitting another of the plurality of first IP packets to a surveilling agency computer system without encoding or decoding the another of the plurality of first IP packets, transmitting one of the plurality of second IP packets to the first communications device according to one or more of the call initiation data, and transmitting another of the plurality of second IP packets to the surveilling agency computer system without encoding or decoding the another of the plurality of second IP packets.

One embodiment includes an apparatus for IP-based call content intercept, including means for receiving at least one call initiation data, means for receiving a first IP packet from the first communications device, means for receiving a second IP packet from a second communications device, means for generating a plurality of first IP packets comprising either the first IP packet and at least one copy of the first IP packet, or at least two copies of the first IP packet, means for generating a plurality of second IP packets comprising either the second IP packet and at least one copy of the second IP packet, or at least two copies of the second IP packet, means for transmitting one of the plurality of first IP packets to the second communications device according to one or more of the call initiation data, means for transmitting another of the plurality of first IP packets to a surveilling agency computer system without encoding or decoding the another of the plurality of first IP packets, means for transmitting one of the plurality of second IP packets to the first communications device according to one or more of the call initiation data, and means for transmitting another of the plurality of second IP packets to the surveilling agency computer system without encoding or decoding the another of the plurality of second IP packets.

One embodiment includes a system for IP-based call content intercept, including a a packet-based media processor adapted to receive a first IP packet from a first communications device and a second IP packet from a second communications device, generate with at least one repeater a plurality of first IP packets comprising either the first IP packet and at least one copy of the first IP packet, or at least two copies of the first IP packet, generate with at least one repeater a plurality of second IP packets comprising either the second IP packet and at least one copy of the second IP packet, or at least two copies of the second IP packet, transmit one of the plurality of first IP packets to the second communications device, transmit another of the plurality of first IP packets to a surveilling agency computer system, transmit one of the plurality of second IP packets to the first communications device, and transmit another of the plurality of second IP packets to the surveilling agency computer system.

Further features of the invention, as well as the structure and operation of various embodiments of the invention, are described in detail below with reference to the accompanying drawings.

BRIEF DESCRIPTION OF THE DRAWINGS

Embodiments will now be described in connection with the associated drawings, in which.

DEFINITIONS

Figure 1A:
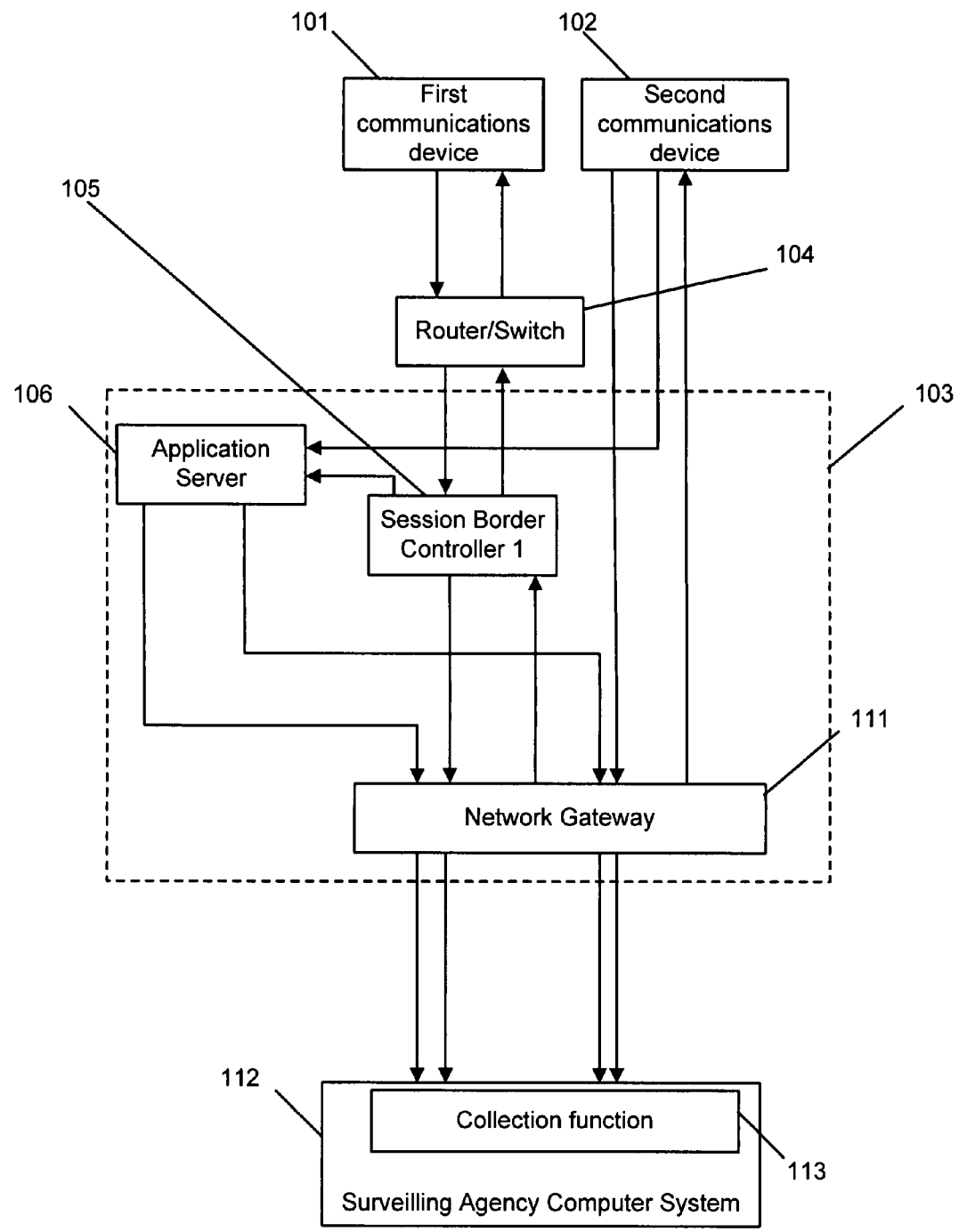
FIGS. 1A, 1B, and 1C, and 1D depict four prior art systems for intercepting call content.
Figure 1B:
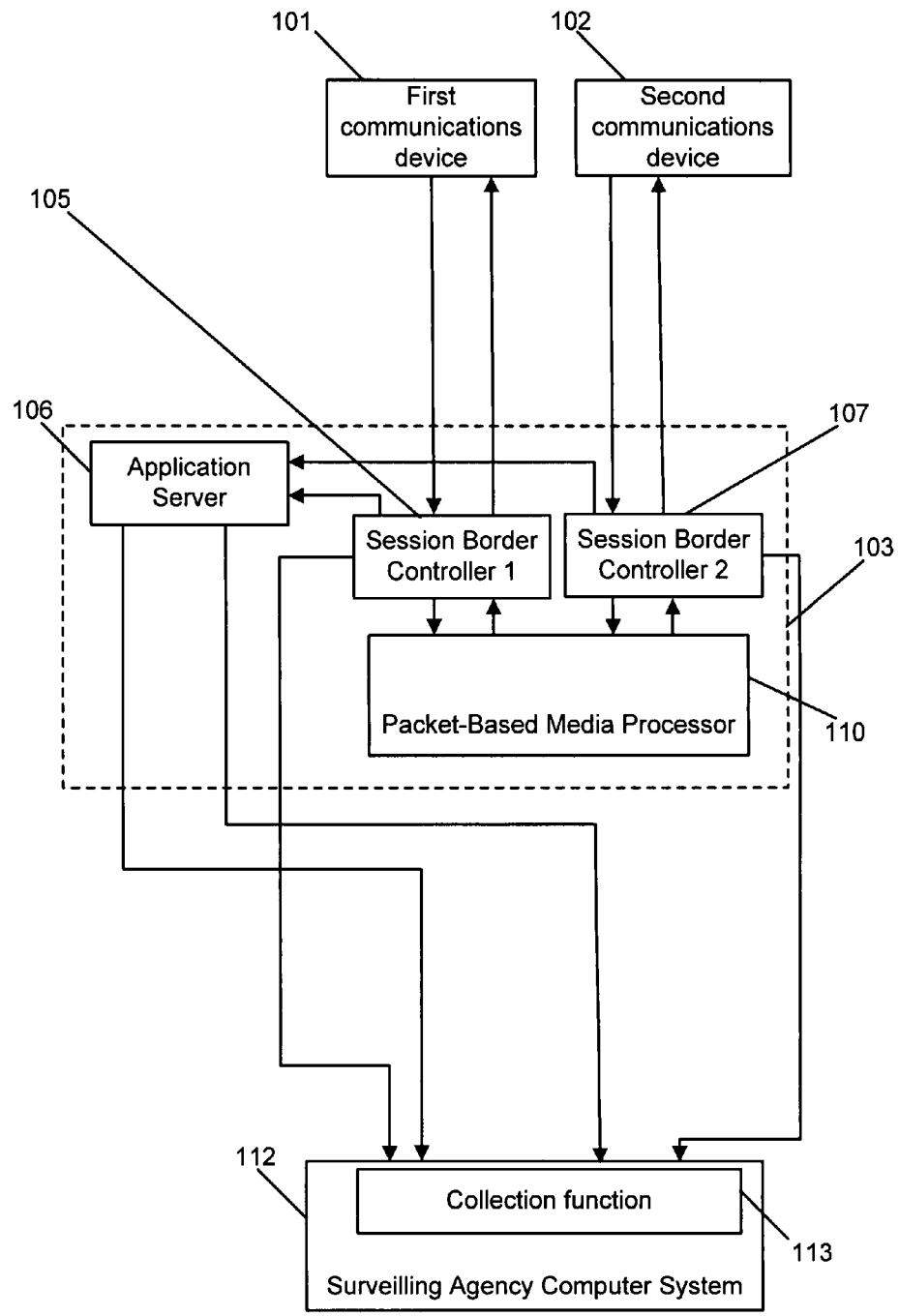
Figure 1C:
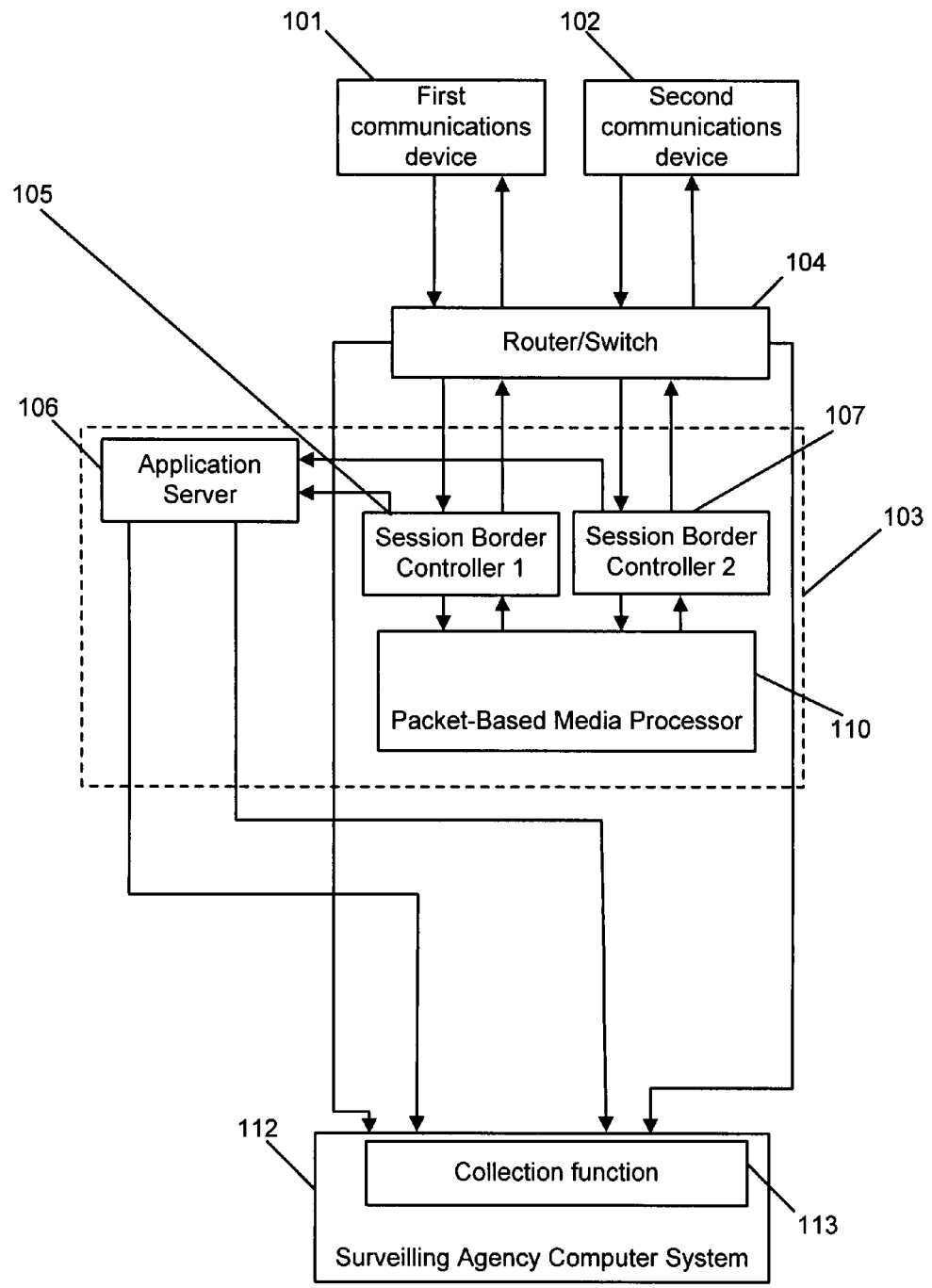
Figure 1D:
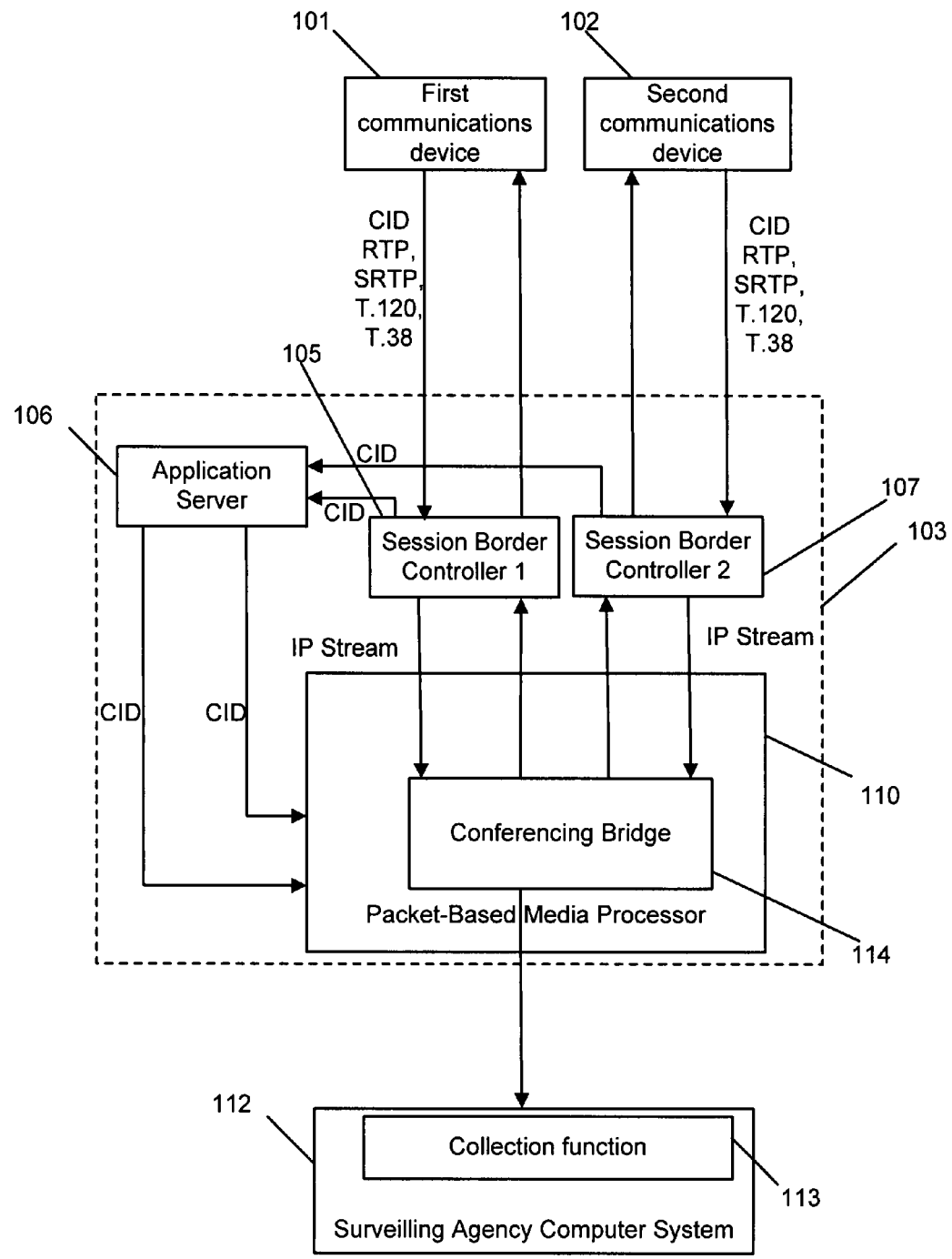
Figure 2:
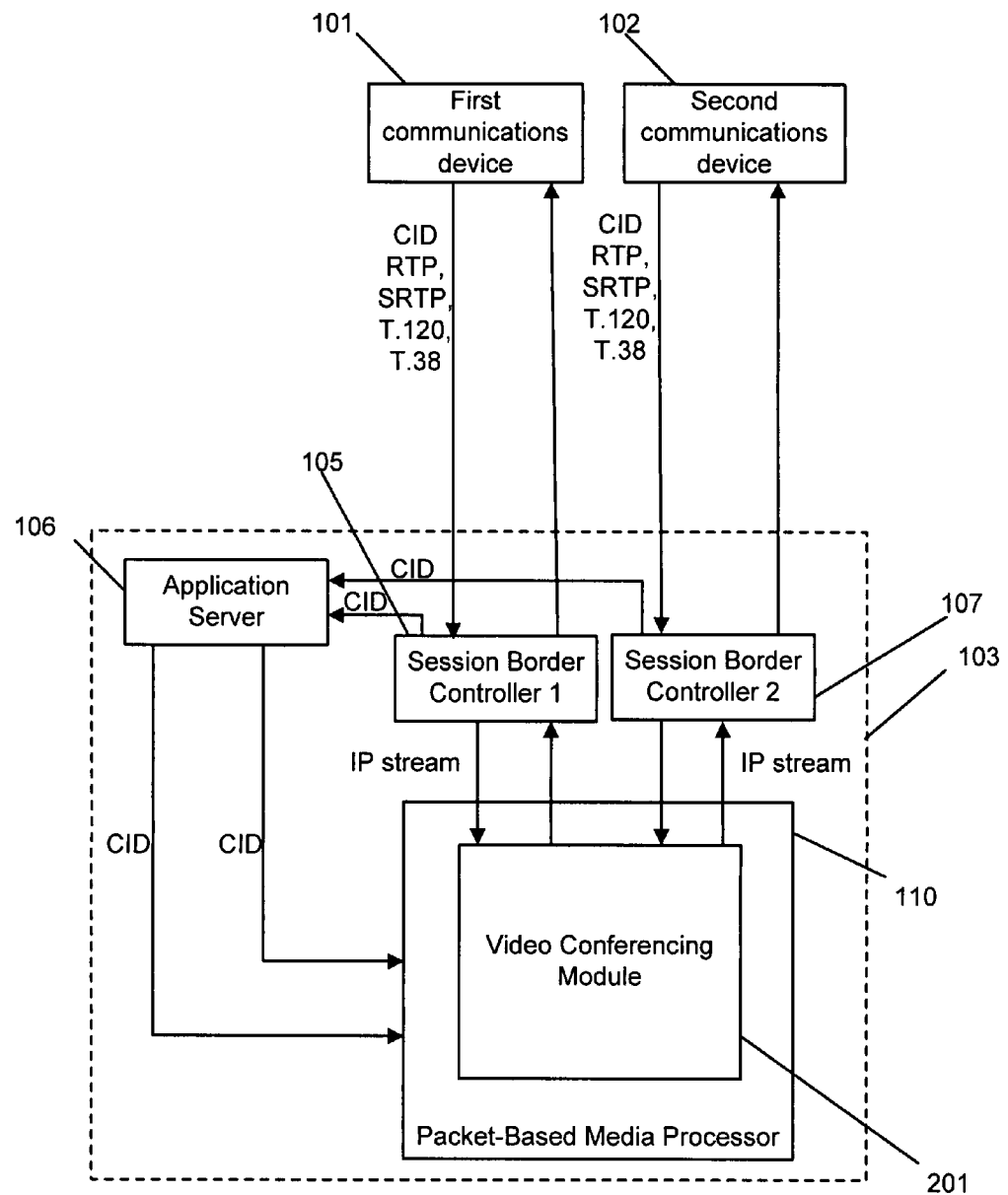
FIG. 2 depicts an exemplary embodiment of the use of a packet-based media processor in a VoIP network according to the prior art.

In describing the invention, the following definitions are applicable throughout (including above).

A "computer" may refer to one or more apparatus and/or one or more systems that are capable of accepting a structured input, processing the structured input according to prescribed rules, and producing results of the processing as output. Examples of a computer may include: a computer; a stationary and/or portable computer; a computer having a single processor, multiple processors, or multi-core processors, which may operate in parallel and/or not in parallel; a general purpose computer; a supercomputer; a mainframe; a super mini-computer; a mini-computer; a workstation; a micro-computer; a server; a client; an interactive television; a web appliance; a telecommunications device with internet access; a hybrid combination of a computer and an interactive television; a portable computer; a tablet personal computer (PC); a personal digital assistant (PDA); a portable telephone; application-specific hardware to emulate a computer and/or software, such as, for example, a digital signal processor (DSP), a field-programmable gate array (FPGA), an application specific integrated circuit (ASIC), an application specific instruction-set processor (ASIP), a chip, chips, or a chip set; a system-on-chip (SoC) or a multiprocessor system-on-chip (MPSoC); and an apparatus that may accept data, may process data in accordance with one or more stored software programs, may generate results, and typically may include input, output, storage, arithmetic, logic, and control units.

"Software" may refer to prescribed rules to operate a computer or a portion of a computer. Examples of software may include: code segments; instructions; applets; pre-compiled code; compiled code; interpreted code; computer programs; and programmed logic.

A "computer-readable medium" may refer to any storage device used for storing data accessible by a computer. Examples of a computer-readable medium may include: a magnetic hard disk; a floppy disk; an optical disk, such as a CD-ROM and a DVD; a magnetic tape; a memory chip; and/or other types of media that can store data, software, and other machine-readable instructions thereon.

A "computer system" may refer to a system having one or more computers, where each computer may include a computer-readable medium embodying software to operate the computer. Examples of a computer system may include: a distributed computer system for processing information via computer systems linked by a network; two or more computer systems connected together via a network for transmitting and/or receiving information between the computer systems; and one or more apparatuses and/or one or more systems that may accept data, may process data in accordance with one or more stored software programs, may generate results, and typically may include input, output, storage, arithmetic, logic, and control units.

A "network" may refer to a number of computers and associated devices that may be connected by communication facilities. A network may involve permanent connections such as cables or temporary connections such as those that may be made through telephone or other communication links. A network may further include hard-wired connections (e.g., coaxial cable, twisted pair, optical fiber, waveguides, etc.) and/or wireless connections (e.g., radio frequency waveforms, free-space optical waveforms, acoustic waveforms, etc.). Examples of a network may include: an internet, such as the Internet; an intranet; a local area network (LAN); a wide area network (WAN); and a combination of networks, such as an internet and an intranet. Exemplary networks may operate with any of a number of protocols, such as Internet protocol (IP), asynchronous transfer mode (ATM), and/or synchronous optical network (SONET), user datagram protocol (UDP), IEEE 802.x, etc.

DETAILED DESCRIPTION OF THE EMBODIMENTS

Exemplary embodiments are discussed in detail below. While specific exemplary embodiments are discussed, it should be understood that this is done for illustration purposes only. In describing and illustrating the exemplary embodiments, specific terminology is employed for the sake of clarity. However, the embodiments are not intended to be limited to the specific terminology so selected. A person skilled in the relevant art will recognize that other components and configurations may be used without parting from the spirit and scope of the embodiments. It is to be understood that each specific element includes all technical equivalents that operate in a similar manner to accomplish a similar purpose. The examples and embodiments described herein are non-limiting examples.

In contrast to the prior art, the present embodiments uses repeaters in the packet-based media processor 110 to intercept call content and forward copies of the intercepted call content to the surveilling agency computer system 112.

Figure 3A:
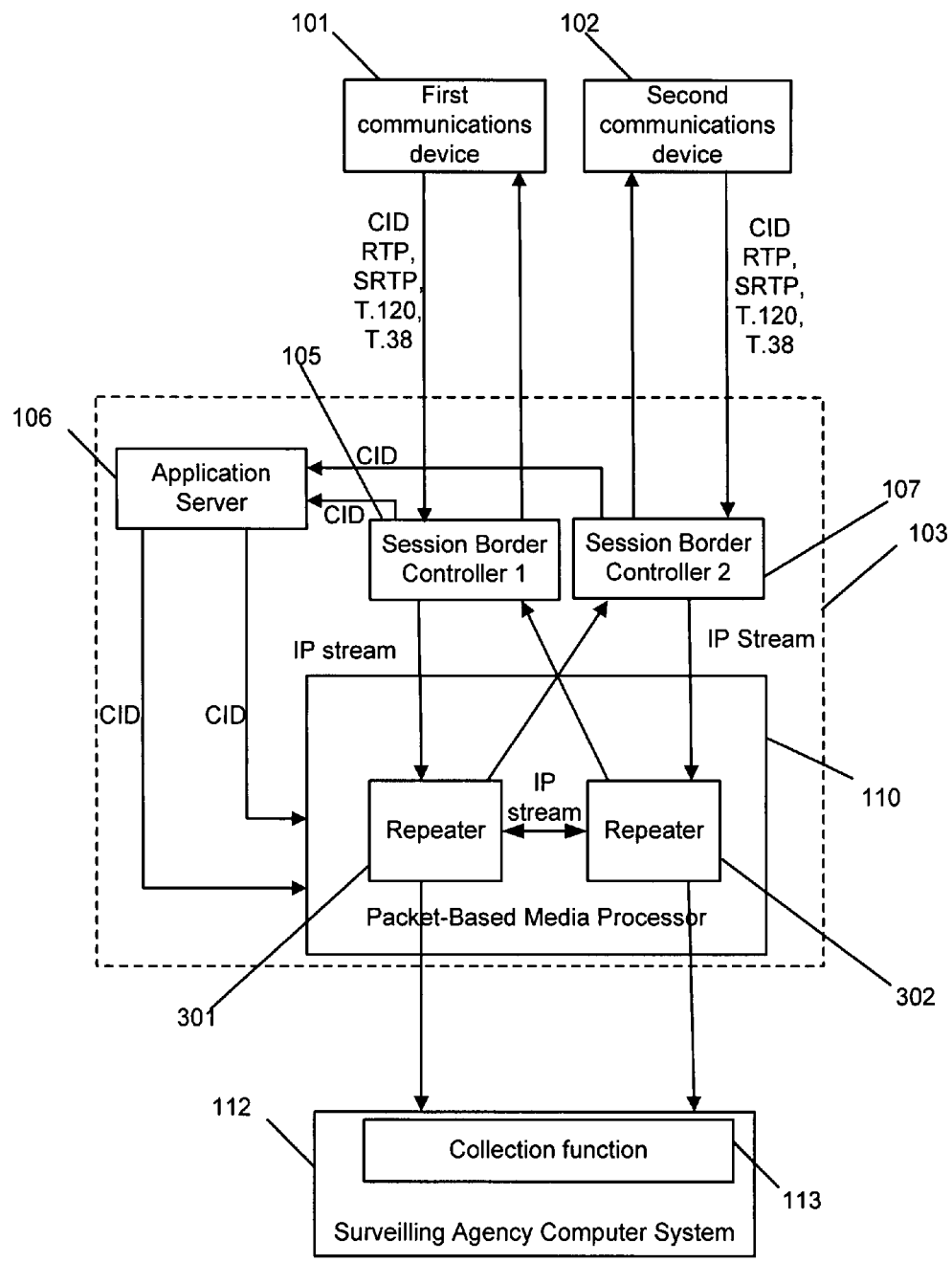
FIG. 3A depicts an exemplary system for IP-based call content intercept using repeaters.

FIG. 3A depicts an exemplary system IP-based call content intercept using repeaters. The first communications device 101 may initiate a call to the second communications device 102 over a VoIP network. An application server 106 may receive call initiation data from the first communications device 101, and determine whether either of the first or second communications devices 101 and 102 is under surveillance. If at least one of the first or second communications devices 101 and 102 is under surveillance, the application server 106 may make changes to the call initiation data sent from the first communications device 101 to the second communications device 102 and from the second communications device 102 to the first communications device 101. The changes to the call initiation data may result in the call content between the first and second communications devices 101 and 102 being routed through the packet-based media processor 110 on the VoIP providers network. The routing may be accomplished by, for example, the session border controllers 105 and 107.

The call content may be transmitted to the session border controllers 105 and 107 from the first and second communication devices 101 and 102 in the form of RTP packets. The session border controllers 105 and 107 may transmit the call content to the packet-based media processor 110 in the form of IP packets, such as, for example, RTP packets, UDP packets, TCP/IP packets, and T.38 packets. The packet-based media processor 110 may make copies of the IP packets incoming from the session border controllers 105 and 107. IP packet copies may be made by repeaters 301 and 302 on the packet-based media processor 110. The repeaters 301 and 302 may be any combination of hardware and software on packet-based media processor 110 suitable for receiving, copying, and transmitting IP packets. For example, the repeaters 301 and 302 may be software constructs using the hardware of packet-based media processor 110, or the repeaters 301 and 302 may be hardware devices, such as, for example, specialized processors, integrated into, or otherwise accessible to, the packet-based media processor 110. The repeaters 301 and 302 may receive incoming IP packets, and make one or more copies of the packets. The repeaters 301 and 302 may apply profiles to when copying incoming IP packets. A profile applied to a packet being copied may result in a copied packet that is packaged differently from the incoming packet, although the packet will still contain the same data, i.e., the same call content. The repeaters 301 and 302 are discussed further below with reference to FIGS. 4-6. The packet-based media processor 110 may transmit copies of the IP packets made by the repeaters 301 and 302 to a surveilling agency computer system 112, and send the original, or copies, of the IP packets to the session border controllers 105 and 107 to be sent to the first and second communications devices 101 and 102.

Figure 3B:
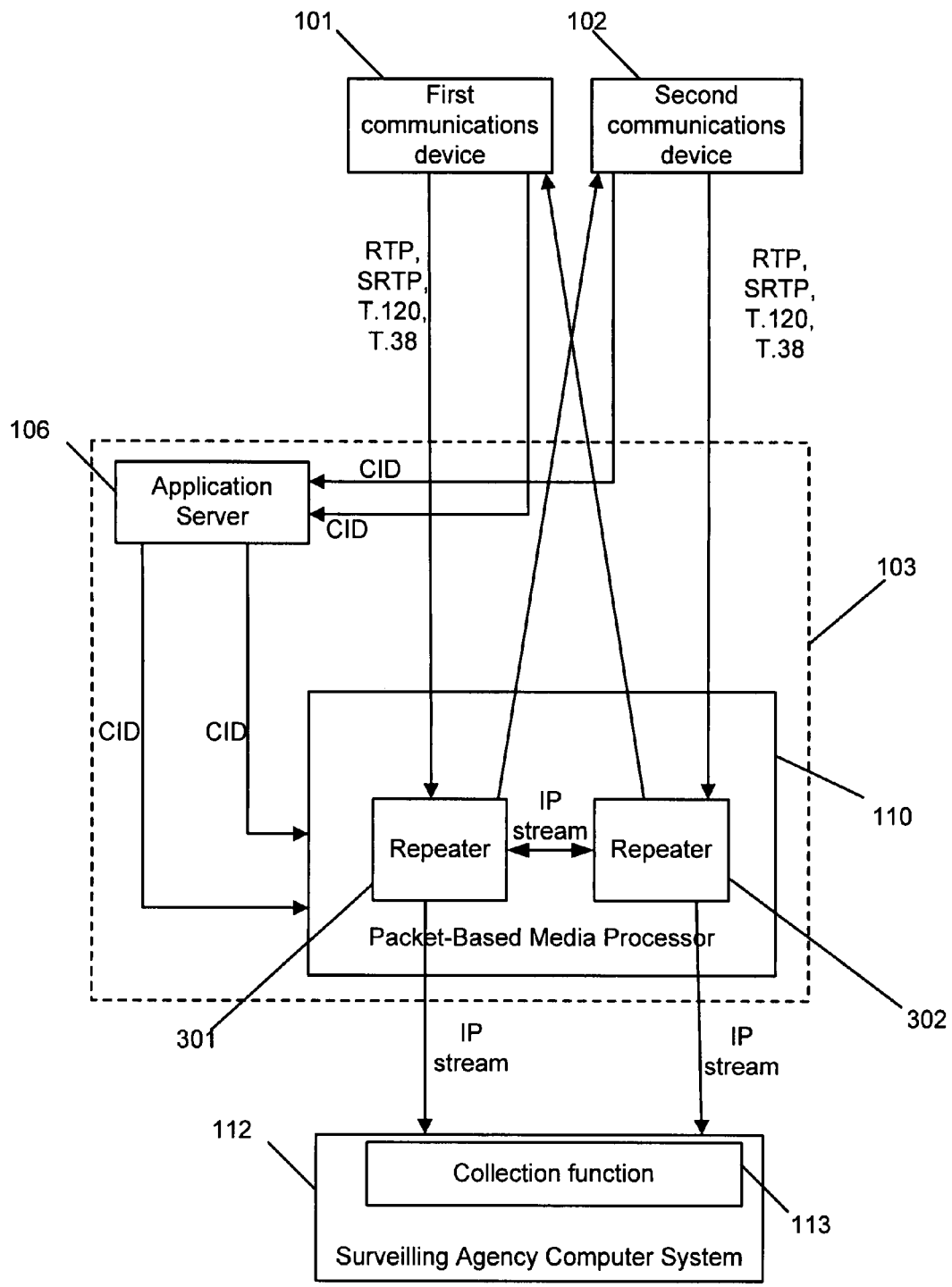
FIG. 3B depicts an alternative exemplary system for IP-based call content intercept using repeaters without session border controllers.

FIG. 3B depicts an alternative exemplary system for IP-based call content intercept using repeaters without session border controllers. The exemplary system depicted in FIG. 3B is functionally the same as the exemplary system of FIG. 3A, except for the absence of the session border controllers 105 and 107. The session border controllers 105 and 107 are not a mandatory part of a VoIP provider's network 103, and call content may be routed to and from the VoIP provider's network 103 without them. The session border controllers 105 and 107 may be used to control the flow of IP packets on the border of the VoIP provider's network. However, the embodiments do not require this functionality.

Figure 3C:
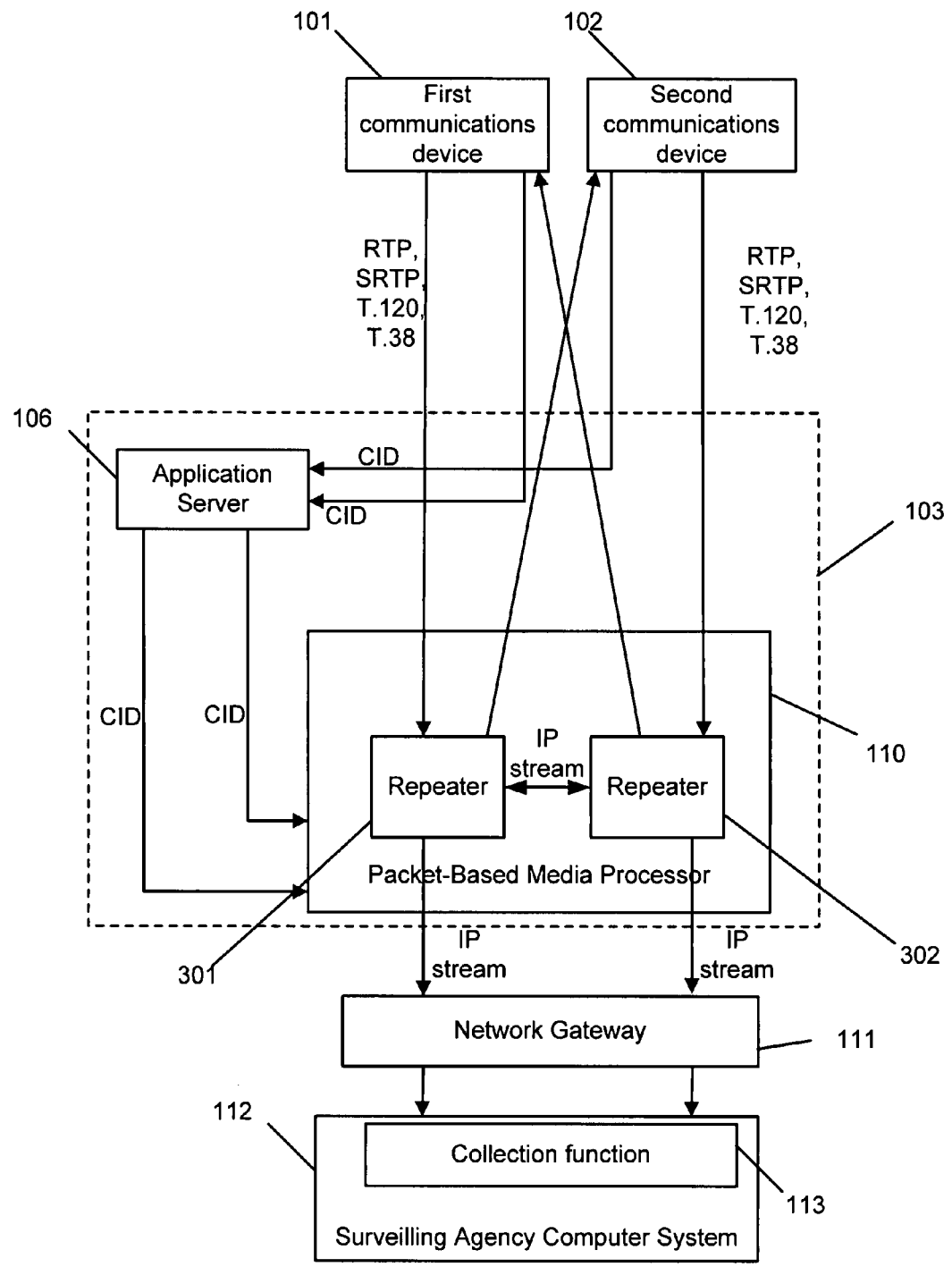
FIG. 3C depicts another alternative exemplary system for IP-based call content intercept using repeaters and a network gateway.

FIG. 3C depicts another alternative exemplary system for IP-based call content intercept using repeaters and a network gateway. The exemplary system depicted in FIG. 3C is functionally the same as the exemplary system of FIG. 3B, except for the presence of the network gateway 111. In some cases, the surveilling agency computer system 112 may not be capable of accepting an incoming IP-based connection, and may be limited to receiving phone calls as incoming communication. In these cases, to intercept a call using the repeaters 301 and 302, the packet-based media processor 110 may need to establish a telephony connection with the surveilling agency computer system 112, through the network gateway 111. The packet-based media processor 110 may place a call to the surveilling agency computer system 112, and the surveilling agency computer system 112 may pick up the call, establishing the connection. Copied call content may then be transmitted to the surveilling agency computer system 112 through the network gateway 111. The surveilling agency computer system 112 may be limited to receiving only audio content through the network gateway, for example, in the form of TDM signals.

Figure 4:
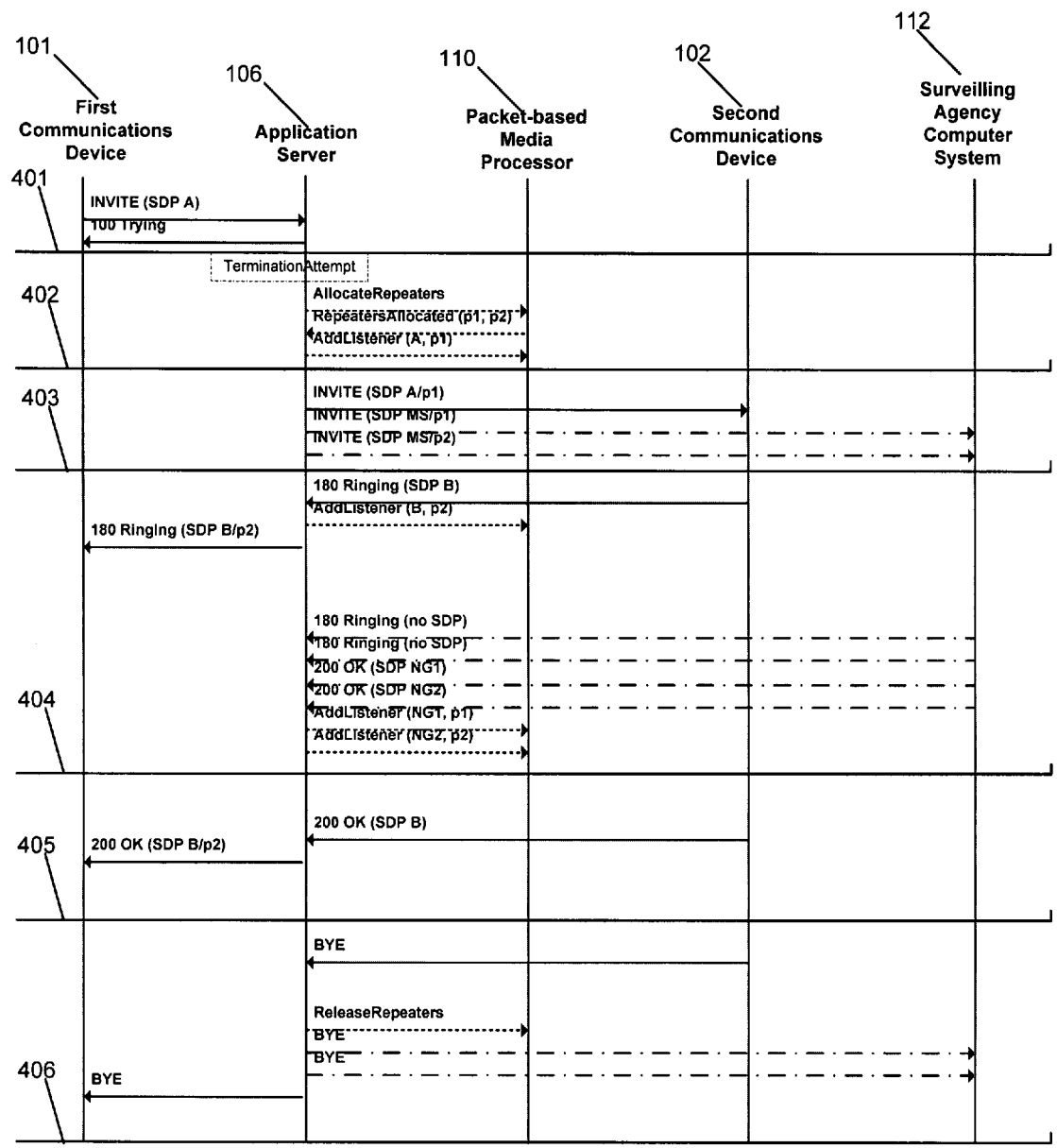
FIG. 4 depicts an exemplary time-flow chart for IP-based call content intercept using repeaters and a network gateway.
Figure 5:
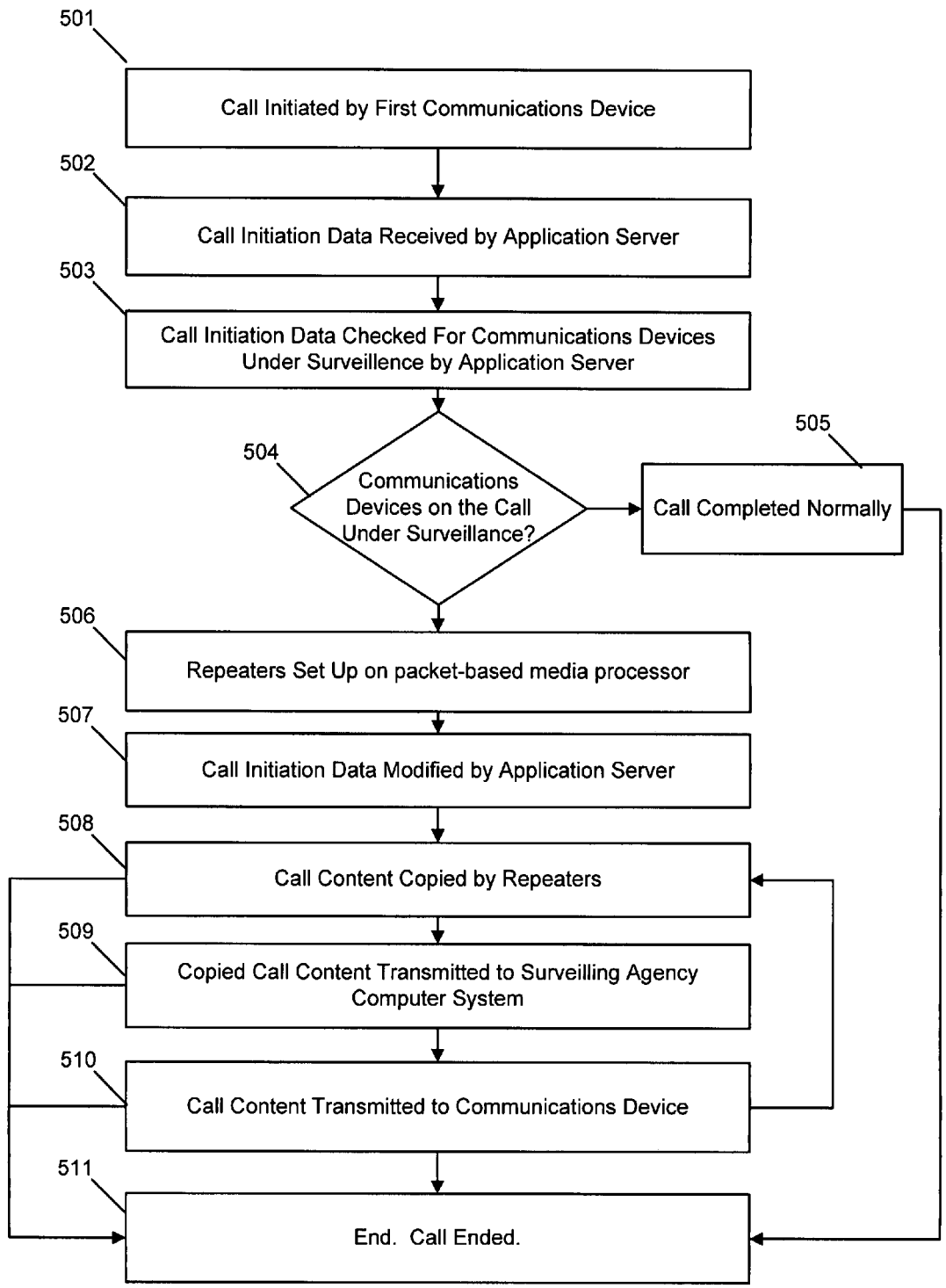
FIG. 5 depicts an exemplary flowchart for IP-based call content intercept using repeaters.

FIG. 4 depicts an exemplary time-flow chart for IP-based call content intercept using repeaters and a network gateway, and FIG. 5 depicts an exemplary flowchart for IP-based call content intercept using repeaters. FIGS. 4 and 5 will be discussed with reference to FIG. 3C. The exemplary time-flow depicted in FIG. 4 differs from exemplary time-flows for FIGS. 3A and 3B due to the presence of the network gateway 110. The exemplary time-flows for FIGS. 3A and 3B would contain IP networks connections to the surveilling agency computer system 112 instead of a calls placed to the surveilling agency computer system 112 in time-slices 403 and 404. The operations of the blocks of the exemplary flowchart depicted in FIG. 5 may be performed by any suitable combination of hardware and software. For example, the operations of the blocks may be performed in whole or in part by one or more stand-alone software package installed on one or more computers.

In block 501, the first communications device 101, on a VoIP network, may initiate a call to the second communications device 102. To initiate the call, the first communications device 101 may transmit call initiation data to the application server 106 on the VoIP provider's network 103.

In block 502, the application server 106 may receive the call initiation data from the first communications device 101. The Application server 106 may use the call initiation data to set up the call between the first communications device 101 and the second communications device 102. Time-slice 401 may be an exemplary time-flow representation of messages exchanged between the first communications device 101 and the application server 106 during blocks 501 and 502. As indicated by the solid line, the first communications device 101 may send an Invite message, conforming to session initiation protocol (SIP), to the application server 106, indicating the intended recipient of the call. Upon receiving the Invite message, the application server 106 may return the SIP message Trying (status code 100), indicating that the application server 106 is attempting to complete the call as requested.

In block 503 the application server 106 may determine whether either of the first communications device 101 or the second communications device 102 are under surveillance, based on the call initiation data. Information the application server 106 may use from the call initiation data may include, for example, data identifying the first communications device 101 and second communications device 102, such as, for example, an IP address, Media Access Control (MAC) Address, assigned phone number, userid, etc. Information from the call initiation data may be, for example, compared to lists which may be stored on, or otherwise accessible to, the application server 106. The lists may contain information that may be used to identify communication devices under surveillance based on call initiation data. Individual surveilling agencies may maintain their own lists including data on communications device placed under surveillance by the individual surveilling agencies. Any other suitable method for identifying whether or not a given communications device is under surveillance by a surveilling agency may also be used by the application server 106.

In block 504, if neither the first communications device 101 nor the second communications device 102 has been placed under surveillance, flow proceeds to block 505. If at least one of the first communications device 101 and second communications device 102 is under surveillance, flow proceeds to block 506.

In block 505, the call initiated by the first communications device 101 may be completed normally. For example, if the call is a voice-only call, the first communications device 101 and second communications device 102 may be connected over the IP-network without passing data through the VoIP provider's network 103. If the call is, for example, a videoconference call, the call may be routed through the packet-based media processor 110 on the VoIP provider's network 103.

In block 506, at least one of the first communications device 101 and the second communications device 102 is under surveillance by at least one surveilling agency. The application server 106 may transmit instructions to the packet-based media processor 110 to set up the repeaters 301 and 302. One repeater may be set up on packet-based media processor 110 for each data stream originating from each party to a call. For example, if the call content is a video conference, each party to the call may generate an audio stream and a video stream. With two parties to the call, four repeaters may be set up on packet-based media processor 110. If three or more communications devices participate in the video conference, two repeaters will be set up on packet-based media processor 110 for each communications device participating in the video conference. If more than one surveilling agency has requested surveillance of the call, each surveilling agency may be added as a listener to the repeaters set up on packet-based media processor 110, or, alternatively, additional repeaters may be set up to support the additional surveilling agencies. Each surveilling agency may have its own surveilling agency computer system similar to surveilling agency computer system 112, and the packet-based media processor 110 may establish a connection with each of the surveilling agency computer systems. Alternatively, an individual repeater may be set up to support connections with multiple surveilling agency computer systems. When more than one surveilling agency computer system is connected to the packet-based media processor 110 to receive copied packets, the presence of each surveilling agency computer system connected may be hidden from all other connected surveilling agency computer systems. The application server 106 may transmit information to the packet-based media processor 110 indicating which surveilling agencies have placed one or both of the first communications device 101 and the second communications device 102 under surveillance. This information may include, or may be used by the packet-based media processor 110 to determine, the surveilling agency computer system 112 to which the repeaters 301 and 302 should transmit the copied call content. The packet-based media processor 110 may establish a connection between the repeaters 301 and 302 and the surveilling agency computer system 112.

The time-slice 402 may be an exemplary time-flow representation of messages exchanged between the application server 106 and the packet-based media processor 110 in setting up the repeaters 301 and 302 in block 506. As indicated by the dashed box, during this time slice the application server 106 may attempt to terminate, i.e., connect, the call between the first communications device 101 and the second communications device 102. The application server 106 may also communicate with the packet-based media processor 110, as indicated by the dashed lines. The application server 106 may instruct the packet-based media processor 110 to allocate the repeaters 301 and 302 for the call. The packet-based media processor 110 may set up the repeaters 301 and 302 and signal this to the application server 106, which may then send an AddListener request to the packet-based media processor 110, instructing the packet-based media processor 110 to add the first communications device 101 to the call. The time-slice 403 may be an exemplary time-flow representation of messages exchanged between the application server 106 and the surveilling agency computer system 112 in establishing a connection to the surveilling agency computer system 112. The application server 106 may first send the Invite from the first communications device 101 to the second communications device 102 in a termination attempt. The application server 106 may then generate its own Invite messages, one for each of the repeaters 301 and 302, to be sent to the surveilling agency computer system 112. In this exemplary time-flow, the surveilling agency computer system 112 may only accept connections through the network gateway 111, thus the application server 106 may call the surveilling agency computer system 112.

In block 507, the application server 106 may modify the call initiation data to cause the call content from the first communications device 101 and the second communications device 102 to be routed through the repeaters 301 and 302. The application server 106 may modify the SDP carried in the SIP INVITE, transmitted in time-slice 403, and SIP 200 OK transmitted in time-slice 405, to the IP address and port of the packet-based media processor 110. The routing of call content through the repeaters 301 and 302 may be invisible to the first communication device 101 and second communication device 102, because of, for example, the presence of session border controllers 105 and 107 between the first and second communication devices 101 and 102 and the internal structure of the VoIP provider's network 103, including the packet-based media processor 110. Other network devices in-between the VoIP provider's network and the first and second and second communications devices 101 and 102 may also result in the routing of the call content being invisible to the first and second communication devices 101 and 102.

The time-slices 404 and 405 may be exemplary time-flow representations of messages exchanged between the first communications device 101, the application server 106, the packet-based media processor 110, the second communications device 102 and the surveilling agency 112 during block 507. In time-slice 404, the surveilling agency 112 is added to the call. First, the second communications device 102, upon receiving the Invite sent in time-slice 403, may respond with the SIP message Ringing. The Ringing message may be transmitted from the application server 106 back to the first communications device 101, indicating to the first communications device 101 that the second communications device 102 has been contacted. The surveilling agency computer system 112 may also respond with Ringing messages to each of the Invites from the applications server 106, and then with OK messages once the surveilling agency computer system 112 answers the incoming calls from the application server 106. The application server 106 may then instruct the packet-based media processor 110 to add the surveilling agency computer system 112 as a listener to both ends of the call, i.e., as a recipient of copied call content from both of the repeaters 301 and 302. In time-slice 405, the second communications device 102 has a connection established with first communications device 101. The second communications device 102 may transmit an OK message back to the application server 106 upon picking up the call. The application server 106 may relay the OK message back to the first communications device 101, indicating to the first communications device 101 that the call has been connected.

In block 508, call content from the first communications device 101 and the second communications device 102 may be copied by the repeaters 301 and 302. Call content, in the form of RTP packets, may be transmitted from the first communications device 101. The RTP packets may enter the VoIP provider's network 103 at, for example, the session border controller 105, where they may be routed to the packet-based media processor 110, and the repeaters 301 and 302 on the packet-based media processor, as IP packets. The IP packets may not need to be filtered by the packet-based media processor 110, as the modifications to the call initiation data may ensure that the IP packets routed to the packet-based media processor and the repeaters 301 and 302 are part of the call under surveillance. The packet-based media processor 110 may route the IP packets to the repeater 301 on the packet-based media processor 110. The repeater 301 may copy the IP packets. Before the copied IP packets are transmitted to the surveilling agency computer system 112, they may be packaged according to a profile provided to repeater 301. For example, the IP packets may be packaged in an ASN.1 envelope. If more than one surveilling agency has placed one or both of first communications device 101 and second communications device 102 under surveillance, the repeater 301 may make additional copies of the IP packet as necessary. Each surveilling agency computer system may have a separate connection to the repeaters 301 and 302.

Call content in the form of RTP packets transmitted from the second communications device 102 may be treated in the same manner as the RTP packets transmitted from the first communications device 101, except the RTP packets may enter the VoIP provider's network 103 at session border controller 107, and may be routed to the repeater 302. The repeater 302 performs the same functions as the repeater 301, only with the IP packets containing call content originating from the second communications device 102.

In block 509, the copied call content may be transmitted to the surveilling agency computer system 112. The repeaters 301 and 302 may transmit the copied IP packets to the surveilling agency computer system 112. The collection function 113 on the surveilling agency computer system 112 may handle the incoming call content according to the setup of the collection function 113.

The repeaters 301 and 302 may transfer any type of IP-based call content to the surveilling agency computer system 112, if no network gateway 111 is present between the packet-based media processor 110 and the surveilling agency computer system 112. This may include, for example, call content that is audio, video, fax, desktop collaboration, or encrypted data. The transfer of the call content may also be codec independent. Audio or video encoded with any codec may be transferred to the surveilling agency computer system 112, even if the codec used to encode the audio or video is unknown to the VoIP provider and/or the surveilling agency computer system 112. Encrypted call content for which the key is not known may also be transferred. In these cases, the collection function 113 may record the call content with the unknown encoding or encryption on a computer readable medium accessible to surveilling agency computer system 112, from which the call content may be retrieved at a later time for decoding or decryption. If a network gateway 111 is present in between the packet-based media processor 110 and the surveilling agency computer system 112, as in FIG. 4, then only audio content may be transferred by the repeaters 301 and 302.

In block 510, the original IP packets may be packaged as the IP packets would have been on a normal call, and routed by the repeaters 301 and 302 back to the packet-based media processor 110. The packet-based media processor 110 may proceed with delivering the packets to the first communications device 101 and the second communications device 102, as would happen in a normal call routed through the packet-based media processor 110.

For the purposes of this exemplary embodiment, the IP packet transmitted to the second communications device 102 from media sever 110 has been referred to as the original IP packet, and the IP packet transmitted to the surveilling agency computer system 112 has been referred to as a copy of the IP packet. One of ordinary skill in the art would understand that the original IP packet and all copies of the original IP packet are interchangeable. For example, the copy of the original IP packet may be transmitted to the surveilling agency computer system 112 and the original IP packet may be transmitted to the second communications device 102. Further, in some circumstances the original IP packet will be destroyed, and only copies of the original IP packet will be transmitted. For example, the original IP packet may be copied twice, into a first copy of the IP packet and a second copy of the IP packet. The first and second copy of the IP packet may be transmitted in the same manner as the original IP packet and the first copy of the IP packet described above.

Blocks 508 through 510 operate continuously until the call is ended by the first communications device 101 or the second communications device 102. The call may end during the operation any of blocks 508 through 510.

In block 511, the call may be ended. Either of the first communications device 101 or second communications device 102 may end the call. The call may be ended by, for example, hanging up the first communications device 101. When the call is ended, the repeaters 301 and 302 on the packet-based media processor 110 may be released or terminated, depending on what combination of hardware and software has been used to implement the repeaters 301 and 302. For example, if the repeaters 301 and 302 are software based processes running on the packet-based media processor 110, the processes may be terminated.

The time slice 406 may be an exemplary time-flow representation of messages exchanged between the first communications device 101, the application server 106, the packet-based media processor 110, the second communications device 102 and the surveilling agency 112 during block 511. The second communications device 102 may end the call by transmitting the SIP message Bye to the application server 106. The application server 106 may then instruct the packet-based media processor 110 to release the repeaters 301 and 302, close the connection between the packet-based media processor 110 and the surveilling agency computer system 112 by transmitting the Bye message to the surveilling agency computer system 112, and then close the connection between the first communications device 101 and the second communications device 102 by transmitting the Bye message to the first communications device 101.

Figure 6:
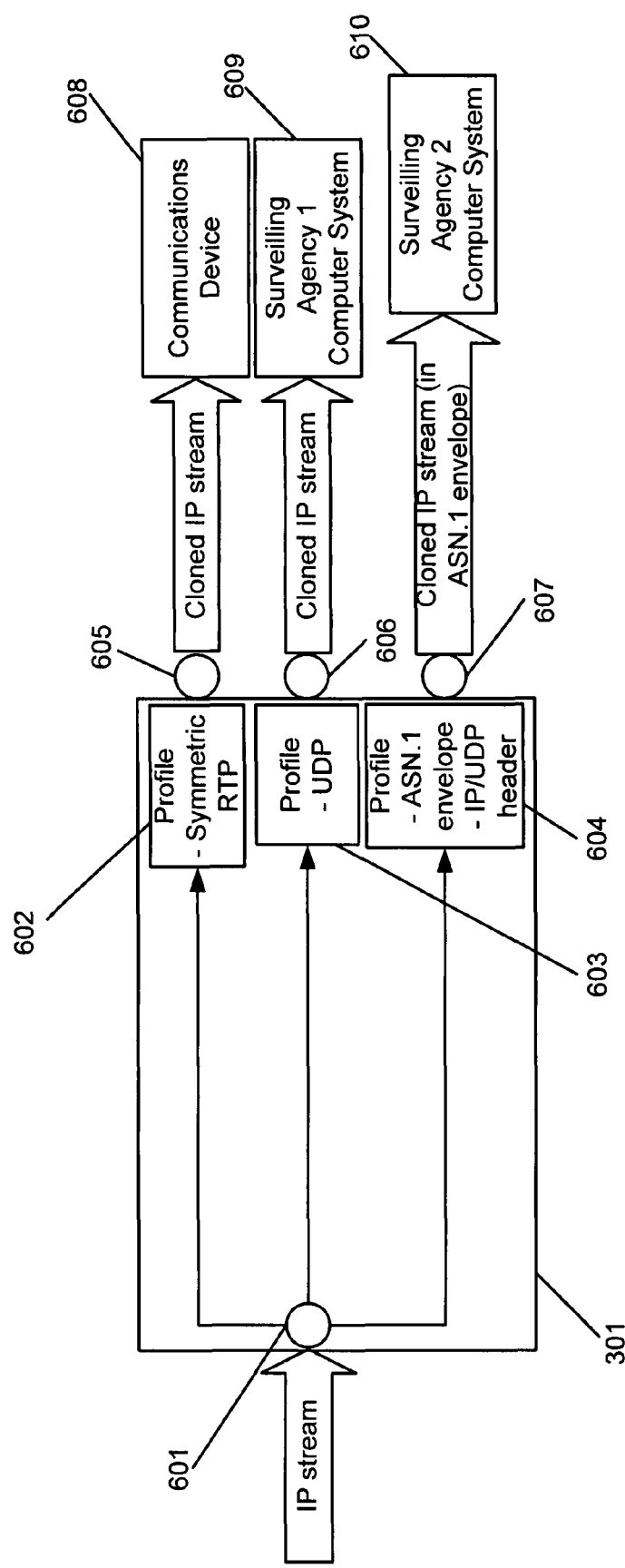
FIG. 6 depicts an exemplary embodiment of the repeaters 301 and 302.

FIG. 6 depicts an exemplary embodiment of the repeater 301. The repeater 302 may have a similar configuration. The repeater 301 may receive incoming IP packet 601 from the IP stream, which may be part of a call. IP packet 601 may be copied a number of times by the repeater 301. The number of copies made of IP packet 601 may be dependent on, for example, the number of recipients the IP packet was originally intended for, for example, the receiver of the call or participants in a conference call, and the number of surveilling agencies that have requested surveillance of at least one of the communications devices involved in the call.

Each copy of the IP packet 601 may be created according to a profile. Profiles 602, 603, and 604 may be used by the repeater 301 to make copies of IP packet 601 that are packaged in accordance with the standards required by the various recipients of the copied IP packets. The profile 602 may be used to create IP packet copy 605, intended to be received by communications device 608, which may be the recipient of the call, for example, second communications device 102. The profile 602 may package the IP packet as it would be packaged in a normal VoIP call, equivalent to what would have happened to the IP packet 601 if the IP packet 601 had not been routed to the repeater 301. The profile 603 may be used to create IP packet copy 606, intended to be received by surveilling agency 1 computer system 609. The profile 603 may package the IP packet as a standard UDP packet without an envelope, so that surveilling agency 1 computer system 609 may receive the raw data of the call content. The profile 604 may be used to create IP packet copy 607, intended to be received by surveilling agency 2 computer system 610. The profile 603 may package the IP packet in an ASN.1 envelope, which may be required for compatibility with surveilling agency 2 computer system 610. Other profiles may be used to package IP packets according to any suitable packaging format.

Figure 7:
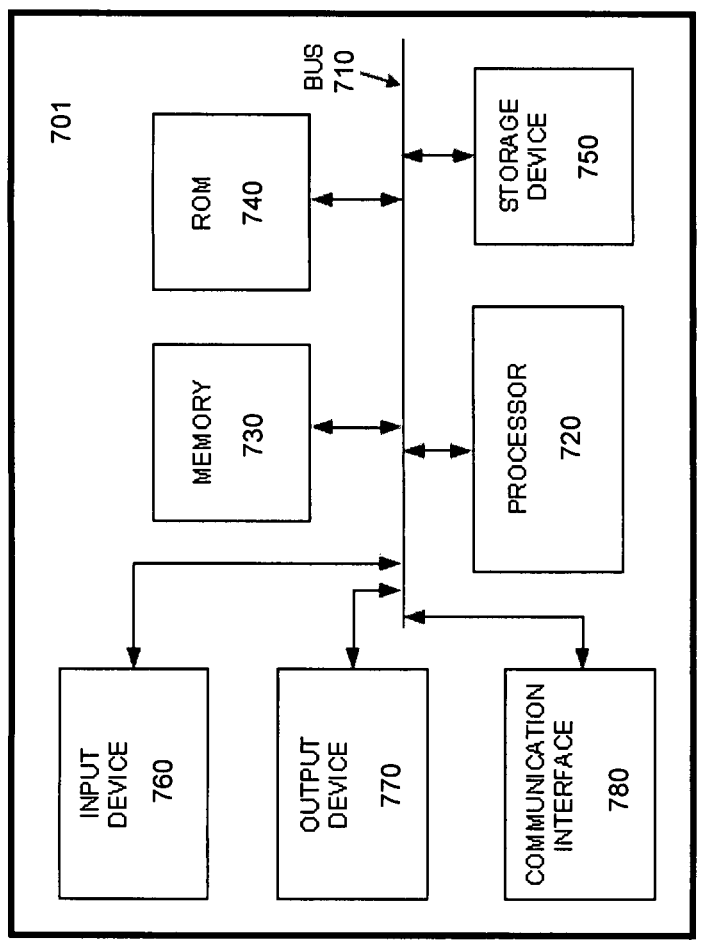
FIG. 7 depicts an exemplary architecture for implementing a computer.

FIG. 7 illustrates an exemplary architecture for implementing a computing device 701, which may be used to implement any of the first communications device 101, the second communications device 102, the router/switch 104, the session border controllers 105 and 107, the applications server 106, the packet-based media processor 110, the network gateway 111, and the surveilling agency computer system 112. It will be appreciated that other devices that can be used with the computing device 701, such as a client or a server, may be similarly configured. As illustrated in FIG. 7, computing device 701 may include a bus 710, a processor 720, a memory 730, a read only memory (ROM) 740, a storage device 750, an input device 760, an output device 770, and a communication interface 780.

Bus 710 may include one or more interconnects that permit communication among the components of computing device 701. Processor 720 may include any type of processor, microprocessor, or processing logic that may interpret and execute instructions (e.g., a field programmable gate array (FPGA)). Processor 720 may include a single device (e.g., a single core) and/or a group of devices (e.g., multi-core). Memory 730 may include a random access memory (RAM) or another type of dynamic storage device that may store information and instructions for execution by processor 720. Memory 730 may also be used to store temporary variables or other intermediate information during execution of instructions by processor 720.

ROM 740 may include a ROM device and/or another type of static storage device that may store static information and instructions for processor 720. Storage device 750 may include a magnetic disk and/or optical disk and its corresponding drive for storing information and/or instructions. Storage device 750 may include a single storage device or multiple storage devices, such as multiple storage devices operating in parallel. Moreover, storage device 750 may reside locally on the computing device 701 and/or may be remote with respect to a server and connected thereto via network and/or another type of connection, such as a dedicated link or channel.

Input device 760 may include any mechanism or combination of mechanisms that permit an operator to input information to computing device 701, such as a keyboard, a mouse, a touch sensitive display device, a microphone, a pen-based pointing device, and/or a biometric input device, such as a voice recognition device and/or a finger print scanning device. Output device 770 may include any mechanism or combination of mechanisms that outputs information to the operator, including a display, a printer, a speaker, etc.

Communication interface 780 may include any transceiver-like mechanism that enables computing device 701 to communicate with other devices and/or systems, such as a client, a server, a license manager, a vendor, etc. For example, communication interface 780 may include one or more interfaces, such as a first interface coupled to a network and/or a second interface coupled to a license manager. Alternatively, communication interface 780 may include other mechanisms (e.g., a wireless interface) for communicating via a network, such as a wireless network. In one implementation, communication interface 780 may include logic to send code to a destination device, such as a target device that can include general purpose hardware (e.g., a personal computer form factor), dedicated hardware (e.g., a digital signal processing (DSP) device adapted to execute a compiled version of a model or a part of a model), etc.

Computing device 701 may perform certain functions in response to processor 720 executing software instructions contained in a computer-readable medium, such as memory 730. In alternative embodiments, hardwired circuitry may be used in place of or in combination with software instructions to implement features consistent with principles of the invention. Thus, implementations consistent with principles of the invention are not limited to any specific combination of hardware circuitry and software.

Exemplary embodiments may be embodied in many different ways as a software component. For example, it may be a stand-alone software package, a combination of software packages, or it may be a software package incorporated as a "tool" in a larger software product. It may be downloadable from a network, for example, a website, as a stand-alone product or as an add-in package for installation in an existing software application. It may also be available as a client-server software application, or as a web-enabled software application. It may also be embodied as a software package installed on a hardware device.

Exemplary embodiments may be used to intercept IP based call content when more than two communications devices participate in the call, such as, for example, during a conference call.

While various exemplary embodiments have been described above, it should be understood that they have been presented by way of example only, and not limitation. Thus, the breadth and scope of the present invention should not be limited by any of the above-described exemplary embodiments, but should instead be defined only in accordance with the following claims and their equivalents.

What is claimed is:

1. A non-transitory computer-readable medium comprising instructions, which when executed by a computer system causes the computer system to perform operations for IP-based call content intercept, the computer-readable medium comprising:
   instructions for receiving at least one call initiation data;
   instructions for receiving a first IP packet from a first communications device;
   instructions for receiving a second IP packet from a second communications device;
   instructions for generating a plurality of first IP packets by a first repeater, wherein the plurality of first IP packets comprise either the first IP packet and at least one copy of the first IP packet, or at least two copies of the first IP packet, wherein generating the plurality of first IP packets comprises applying a repeater profile to at least one IP packet of the plurality of first IP packets, wherein the repeater profile formats packets according to a transmission protocol;
   instructions for generating a plurality of second IP packets by a second repeater, wherein the plurality of second IP packets comprise either the second IP packet and at least one copy of the second IP packet, or at least two copies of the second IP packet, wherein generating the plurality of second IP packets comprises applying the repeater profile to at least one IP packet of the plurality of second IP packets;
   instructions for transmitting one of the plurality of first IP packets to the second communications device according to one or more of the call initiation data;
   instructions for transmitting another of the plurality of first IP packets to a surveilling agency computer system without encoding or decoding the another of the plurality of first IP packets, wherein the surveilling agency computer system receives the another of the plurality of first IP packets over a first connection;
   instructions for transmitting one of the plurality of second IP packets to the first communications device according one or more of the call initiation data; and
   instructions for transmitting another of the plurality of second IP packets to the surveilling agency computer system without encoding or decoding the another of the plurality of second IP packets, wherein the surveilling agency computer system receives the another of the plurality of second IP packets over the first connection;
   instructions for transmitting another one of the plurality of first IP packets to a second surveilling agency computer system without encoding or decoding the another one of the plurality of first IP packets, wherein the second surveilling agency computer system receives the another one of the plurality of first IP packets over a second connection;
   instructions for transmitting another one of the plurality of second IP packets to a second surveilling agency computer system without encoding or decoding the another one of the plurality of second IP packets over a second connection, wherein the second surveilling agency computer system receives the another one of the plurality of second IP packets over the second connection; and
   wherein the first connection and the second connection are separate.

2. The non-transitory computer-readable medium of claim 1, further comprising:
   instructions for determining if the first communications device or the second communications device is under surveillance based on the at least one call initiation data before generating the plurality of first IP packets; and
   instructions for not generating the plurality of first IP packets and not generating the plurality of second IP packets if neither the first communications device nor the second communications device is under surveillance.

3. The non-transitory computer-readable medium of claim 1, wherein the surveilling agency computer system does not detect the second surveilling agency computer system and the second surveilling agency computer system does not detect the surveilling agency computer system.

4. The non-transitory computer-readable medium of claim 1, wherein the first IP packet is selected from a group consisting of an RTP packet, a UDP packet, a SRTP packet, a TCP/IP packet, and a T.38 packet; and
   the second IP packet is selected from a group consisting of one of RTP packet, a UDP packet, a SRTP packet, a TCP/IP packet, and a T.38.

5. The non-transitory computer-readable medium of claim 1, wherein the first IP packet is the IP packet of a stream selected from a group consisting of an audio packet stream comprising at least one of audio, modem, and fax signals, a video packet stream, a text messaging packet stream, and desktop collaboration data packet stream; and
   the second IP packet is the IP packet of a stream selected from a group consisting of an audio packet stream comprising at least one of audio, modem, and fax signals, a video packet stream, a text messaging packet stream, and desktop collaboration data packet stream.

6. The non-transitory computer-readable medium of claim 1, wherein the first IP packet and the second IP packet are not checked for originating IP address and destination IP address before being copied.

7. The non-transitory computer-readable medium of claim 1, wherein the first IP packet and the second IP packet are received and routed by a plurality of session border controllers.

8. The non-transitory computer-readable medium of claim 1, wherein transmitting the another of the plurality of first IP packets and the another of the plurality of second IP packets to the surveilling agency computer system further comprises forwarding the another of the plurality of first IP packets and the another of the plurality of second IP packets to a network gateway.

9. The non-transitory computer-readable medium of claim 1, further comprising:
   instructions for receiving a third IP packet from a third communications device;
   instructions for generating a plurality of third IP packets comprising either the third IP packet and at least one copy of the third IP packet, or at least two copies of the third IP packet;
   instructions for transmitting one of the plurality of third IP packets to the surveilling agency computer system without encoding or decoding the one of the plurality of third IP packets;
   instructions for transmitting another of the plurality of third IP packets to the first communications device according to one or more of the call initiation data; and
   instructions for transmitting another one of the plurality of third IP packets to the second communications device according to one of the one or more call initiation data.

10. The non-transitory computer-readable medium of claim 1, wherein the first repeater and the second repeater are the same repeater.

11. The non-transitory computer-readable medium of claim 1, wherein applying the repeater profile comprises packaging at least one IP packet of the plurality of first IP packets or packaging at least one IP packet of the plurality of second IP packets in accordance with a packet format of the surveilling agency computer system.

12. The non-transitory computer-readable medium of claim 11, wherein the packet format is in accordance with a packet standard of the surveilling agency computer system.

13. The non-transitory computer-readable medium of claim 11, wherein the packet format comprises at least one of: User Datagram Protocol (UDP), Real-time Transport Protocol (RTP), or Abstract Syntax Notation One (ASN.1).

14. A computer-implemented method for Internet Protocol (IP)-based call content intercept, comprising:
 receiving at least one call initiation data;
 receiving a first IP packet from a first communications device;
 receiving a second IP packet from a second communications device;
 generating a plurality of first IP packets by a first repeater, wherein the plurality of first IP packets comprise either the first IP packet and at least one copy of the first IP packet, or at least two copies of the first IP packet, wherein generating the plurality of first IP packets comprises applying a repeater profile to at least one IP packet of the plurality of first IP packets, wherein the repeater profile formats packets according to a transmission protocol;
 generating a plurality of second IP packets by a second repeater, wherein the plurality of second IP packets comprise either the second IP packet and at least one copy of the second IP packet, or at least two copies of the second IP packet, wherein generating the plurality of second IP packets comprises applying the repeater profile to at least one IP packet of the plurality of of second IP packets;
 transmitting one of the plurality of first IP packets to the second communications device according to one or more of the call initiation data;
 transmitting another of the plurality of first IP packets to a surveilling agency computer system without encoding or decoding the another of the plurality of first IP packets;
 transmitting one of the plurality of second IP packets to the first communications device according to one or more of the call initiation data; and
 transmitting another of the plurality of second IP packets to the surveilling agency computer system without encoding or decoding the another of the plurality of second IP packets, wherein the surveilling agency computer system receives the another of the plurality of first IP packets and the another of the plurality of second IP packets over a first connection;
 transmitting another one of the plurality of first IP packets to a second surveilling agency computer system without encoding or decoding the another one of the plurality of first IP packets; and
 transmitting another one of the plurality of second IP packets to a second surveilling agency computer system without encoding or decoding the another one of the plurality of second IP packets, wherein the second surveilling agency computer system receives the another one of the plurality of first IP packets and the another one of the plurality of second IP packets over a second connection; and
 wherein the first connection and the second connection are separate.

15. The computer-implemented method of claim 14, further comprising, after receiving the at least one call initiation data:
 determining if the first communications device or the second communications device is under surveillance based on the one or more of the call initiation data before generating the plurality of the first IP packets; and
 if neither the first communications device nor the second communications device is under surveillance, not generating the plurality of first IP packets and not generating the plurality of second IP packets.

16. The computer-implemented method of claim 14, wherein the first IP packet and the second IP packet are received and routed by a plurality of session border controllers.

17. The computer-implemented method of claim 14, wherein transmitting the another of the plurality of first IP packets and the another of the plurality of second IP packets to the surveilling agency computer system further comprises forwarding the another of the plurality of first IP packets and the another of the plurality of second IP packets to a network gateway.

18. The method of claim 14, wherein applying the repeater profile comprises:
 packaging at least one IP packet of the plurality of first IP packets or at least one IP packet of the plurality of second IP packets with first communications device data; or
 packaging at least one IP packet of the plurality of first IP packets or at least one IP packet of the plurality of second IP packets with second communications device data; and
 wherein:
  the first communications device data comprises at least one of an IP address, a port number, surveilling agency computer system information, or a codec; or
  the second communications device data comprises at least one of an IP address, a port number, surveilling agency computer system information, or a codec.

19. A system for IP-based call content intercept comprising:
 a packet-based media processor adapted to:
  receive a first IP packet from a first communications device;
  receive a second IP packet from a second communications device;
  generate with at least one repeater a plurality of first IP packets comprising either the first IP packet and at least one copy of the first IP packet, or at least two copies of the first IP packet;
  generate with at least one repeater a plurality of second IP packets comprising either the second IP packet and at least one copy of the second IP packet, or at least two copies of the second IP packet;
  transmit one of the plurality of first IP packets to the second communications device;
  applying a repeater profile to one of the plurality of first IP packets, wherein the repeater profile packages one of the plurality of first IP packets according to a protocol required by the second communications device;
  transmit one of the plurality of first IP packets to a surveilling agency computer system, wherein the surveilling agency computer receives the one of the plurality of first IP packets over a first connection;
transmit one of the plurality of second IP packets to the first communications device;
applying the repeater profile to one of the plurality of second IP packets, wherein the repeater profile packages one of the plurality of second IP packets according to a protocol required by the first communications device;
transmit one of the plurality of second IP packets to the surveilling agency computer system, wherein the surveilling agency computer receives the one of the plurality of second IP packets over the first connection;
transmit another one of the plurality of first IP packets and another one of the second IP packets to a second surveilling agency computer, wherein the second surveilling agency computer receives the another one of the plurality of first IP packets and the another one of the second IP packets over a second connection; and
wherein the first connection and the second connection are separate.

20. The system of claim 19, further comprising:
an application server adapted to receive call initiation data, transmit a message to the packet-based media processor instructing the packet-based media processor to setup at least one repeater, and modify the call initiation data to cause the first IP packet from the first communications device and the second IP packet from the second communications device to be transmitted to the packet-based media processor.

21. An apparatus for IP-based call content intercept, comprising:
a packet-based media processor for receiving call initiation data, wherein the packet-based media processor comprises:
a first repeater configured to:
receive a first IP packet from a first communications device;
generate a plurality of first IP packets, wherein the plurality of first IP packets comprise either the first IP packet and at least one copy of the first IP packet, or at least two copies of the first IP packet;
transmitting at least one of the plurality of first IP packets to a second communications device according to the call initiation data;
applying a first repeater profile to at least one of the plurality of first IP packets, wherein the first repeater profile packages the at least one of the plurality of first IP packets according to a first transmission protocol; and
transmitting at least one of the plurality of first IP packets to a surveilling agency computer system without encoding or decoding the least one of the plurality of first IP packets, wherein the surveilling agency computer system receives the at least one of the plurality of first IP packets over a first connection;
transmitting a second at least one of the plurality of first IP packets to a second surveilling agency computer system, wherein the second surveilling agency computer system receives the second at least one of the plurality of first IP packets over a second connection; and
a second repeater configured to:
receive a second IP packet from the second communications device;
generate a plurality of second IP packets, wherein the plurality of second IP packets comprise either the second IP packet and at least one copy of the second IP packet, or at least two copies of the second IP packet;
transmitting at least one of the plurality of second IP packets to the first communications device according to the call initiation data;
applying a second repeater profile to at least one of the plurality of second IP packets, wherein the second repeater profile packages the at least one of the plurality of second IP packets according to a second transmission protocol; and
transmitting at least one of the plurality of second IP packets to the surveilling agency computer system without encoding or decoding the least one of the plurality of second IP packets, wherein the surveilling agency computer system receives the at least one of the plurality of second IP packets over the first connection;
transmitting a second at least one of the plurality of second IP packets to the second surveilling agency computer system, wherein the second surveilling agency computer system receives the second at least one of the plurality of first IP packets over the second connection; and
wherein the first connection and the second connection are separate.

22. The apparatus of claim 21, wherein the packet-based media processor determines
if the first communications device or the second communications device is under surveillance based on the at least one call initiation data before generating the plurality of first IP packets and the plurality of first IP packets and the plurality of second IP packets are not generated if neither the first communications device nor the second communications device is under surveillance.

23. The apparatus of claim 21, wherein the first IP packet and the second IP packet are received and routed by a plurality of session border controllers.

24. The apparatus of claim 21, wherein transmitting the at least one of the plurality of first IP packets to the surveilling agency computer system and the at least one of the plurality of second IP packets to the surveilling agency computer system further comprises forwarding the at least one of the plurality of first IP packets and the at least one of the plurality of second IP packets to a network gateway.

25. The apparatus of claim 21, wherein the first repeater or second repeater are implemented with hardware.

26. The apparatus of claim 21, wherein the repeater profile comprises at least one of: User Datagram Protocol (UDP), Real-time Transport Protocol (RTP), or Abstract Syntax Notation One (ASN.1).

* * * * *